United States Patent
Stauske et al.

(10) Patent No.: US 7,850,247 B2
(45) Date of Patent: Dec. 14, 2010

(54) VEHICLE SEAT ASSEMBLY WITH POLYMERIC CUSHION PAN

(75) Inventors: Marc Stauske, White Lake, MI (US); James R. Ministrelli, Clarkston, MI (US); Keith R. Kwasny, Northville, MI (US); Marc Poulin, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/233,732

(22) Filed: Sep. 19, 2008

(65) Prior Publication Data

US 2010/0072804 A1    Mar. 25, 2010

(51) Int. Cl.
*A47C 7/02*    (2006.01)
*A47C 7/28*    (2006.01)

(52) U.S. Cl. ............................ 297/452.38; 297/452.59; 297/452.52; 297/452.24

(58) Field of Classification Search ............ 297/452.59, 297/452.58, 452.55, 452.52, 452.38, 452.24, 297/313, 452.6, 452.62, 218.5, 218.3, 218.2, 297/334; 5/402, 403, 404, 405, 406, 407
See application file for complete search history.

(56) References Cited

U.S. PATENT DOCUMENTS

| | | | |
|---|---|---|---|
| 1,774,191 A * | 8/1930 | Stannard | 5/402 |
| 2,355,762 A * | 8/1944 | Van Derveer | 297/313 |
| 3,451,718 A * | 6/1969 | Kaufman | 297/239 |
| 3,951,451 A | 4/1976 | Srock | |
| 4,789,201 A * | 12/1988 | Selbert | 297/218.1 |
| 4,861,104 A * | 8/1989 | Malak | 297/218.3 |
| 4,973,105 A * | 11/1990 | Itou | 297/344.12 |
| 5,203,607 A * | 4/1993 | Landi | 297/214 |
| 5,236,247 A | 8/1993 | Hewko | |
| 5,288,133 A * | 2/1994 | Mizushima et al. | 297/452.38 |
| 5,581,457 A | 12/1996 | Tsukahara | |
| 5,836,547 A * | 11/1998 | Koch et al. | 244/122 R |
| 5,988,757 A | 11/1999 | Vishey et al. | |
| 6,142,563 A * | 11/2000 | Townsend et al. | 297/216.1 |
| 6,568,761 B2 * | 5/2003 | Perske et al. | 297/452.6 |
| 6,672,666 B2 | 1/2004 | Stiller et al. | |
| 7,131,697 B2 | 11/2006 | Beermann et al. | |
| 2005/0168041 A1 | 8/2005 | Glance et al. | |
| 2006/0026837 A1 * | 2/2006 | Binelli | 29/897.312 |
| 2008/0018162 A1 * | 1/2008 | Galbreath et al. | 297/452.48 |

* cited by examiner

*Primary Examiner*—Milton Nelson, Jr.
(74) *Attorney, Agent, or Firm*—Brooks Kushman P.C.

(57) ABSTRACT

A vehicle seat assembly having a backrest member and a seat bottom subassembly connected to the backrest member. The seat bottom subassembly has a cushion pan comprising a polymeric material, a cushion comprising a foam material supported on the cushion pan, and a trim layer comprising a fabric material disposed over the cushion. The cushion pan defines a plurality of integral trim attachment features. The trim layer is attached to the cushion pan through engagement with the trim attachment features.

20 Claims, 4 Drawing Sheets

VEHICLE SEAT ASSEMBLY WITH POLYMERIC CUSHION PAN

BACKGROUND OF THE INVENTION

1. Field of the Invention

Embodiments of the inventions relates to the field of vehicle seat assemblies having polymeric cushion pans.

2. Background Art

Conventional vehicle seat assemblies include a backrest member for supporting the back of a seat occupant and a seat bottom portion for supporting a person's posterior. The backrest and the seat bottom are typically connected to one another with the backrest typically being pivotable with respect to the seat bottom.

Conventional seat bottoms typically include a foam cushion covered by upholstery also known as seat trim or trim. The foam cushion is supported by a cushion pan. Conventional cushion pans are typically fabricated from steel or other metals. Metal cushion pans are typically thicker than they need to be because of the limitations associated with the manufacturing processes. While thinner metal could be used to fabricate seat cushion pans, it is difficult to obtain the desired thickness of the metal consistently across the entire metal surface using conventional metal forming processes. This results in the use of thicker sheets of metal than desired for the fabrication of seat cushion pans and, consequently, vehicle seats which are heavier and which use more steel or other metal than necessary.

It would be desirable to fabricate a seat cushion pan using a material other than metal having a lighter weight and a lower cost yet providing similar and acceptable levels of strength. Embodiments of the invention described herein address these and other problems.

SUMMARY OF THE INVENTION

Various embodiments of vehicle seat assemblies are disclosed herein. In a first embodiment, the vehicle seat assembly comprises a backrest member and a seat bottom subassembly connected to the backrest member. The seat bottom subassembly has a cushion pan comprising a polymeric material, a cushion comprising a foam material supported on the cushion pan, and a trim layer comprising a fabric material disposed over the cushion. In this first embodiment, a surface of the cushion pan defines a plurality of integral trim attachment features. The trim layer is attached to the cushion pan through engagement with the trim attachment features.

In an implementation of the first embodiment, each of the trim attachment features comprises a pair of barbs that is configured to receive a portion of the trim layer. In a variation of this implementation, the trim layer further includes a plurality of engagement members disposed around a portion of a periphery of the trim layer. The attachment features are disposed around a portion of a periphery of a cushion pan. In a further variation, each of the engagement members is configured to snap fit into a respective pair of barbs.

In another implementation of the first embodiment, a surface of the cushion pan is contoured to define two longitudinally oriented depressions substantially symmetrically arranged about a central longitudinal axis of the cushion pan.

In another implementation of the first embodiment, a surface of the cushion pan defines a cavity for receiving an electrical component. In a variation of this implementation, the cavity is defined in an upper surface of the cushion pan.

In another implementation of the first embodiment, the seat bottom subassembly further includes a linkage that is connected to the cushion pan for controlling a tilt angle of the seat bottom subassembly. A bottom surface of the cushion pan defines a stanchion to receive the linkage.

In a second embodiment, the vehicle seat assembly comprises a back rest member and a seat bottom subassembly that is connected to the back rest member. The seat bottom subassembly having a cushion pan comprising a polymeric material, a first side shield that is integral with the cushion pan, the first side shield being disposed substantially adjacent a periphery of the cushion pan and oriented substantially transverse to the cushion pan, a cushion comprising a foam material supported on the cushion pan, and a trim layer comprising a fabric material disposed over the cushion. In this second embodiment, a surface of the cushion pan defines a plurality of integral trim attachment features disposed about a periphery of the cushion pan. The trim layer is attached to the cushion pan through engagement with the trim attachment features.

In an implementation of the second embodiment, a surface of the side shield defines an opening that is configured to receive a control mechanism mounting subassembly.

In another implementation of the second embodiment, a portion of the plurality of trim attachment features are disposed between the cushion pan and the first side shield. In a variation of this implementation, the seat bottom subassembly further comprises a second side shield integral with the cushion pan. The second side shield is disposed substantially adjacent a periphery of the cushion pan and is positioned generally opposite to the first side shield. The second side shield is oriented substantially transverse to the cushion pan.

In another implementation of the second embodiment, a surface of the cushion pan defines a plurality of spring engagement apertures. The seat bottom subassembly further comprises a plurality of springs, each spring engaging a respective one of the spring engagement apertures. The plurality of springs cooperating with the cushion pan to support the cushion.

In another implementation of the second embodiment, a surface of the cushion pan is contoured to define two longitudinally oriented depressions that are substantially symmetrically arranged about a central longitudinal axis of the cushion pan.

In another implementation of the second embodiment, an upper surface of the cushion pan defines a cavity for receiving an electrical component.

In another implementation of the second embodiment, the seat bottom subassembly further includes a linkage that is connected to the cushion pan for controlling a tilt angle of the seat bottom subassembly. A bottom surface of the cushion pan defines a stanchion configured to receive the linkage.

In a third embodiment, the vehicle seat assembly comprises a back rest member and a seat bottom subassembly connected to the back rest member. The seat bottom subassembly having a cushion pan comprising a polymeric material. The cushion pan having a generally horizontal upper surface and a lower surface defining a plurality of walls oriented transversely to the upper surface. The plurality of walls comprises a honeycomb structure. The seat bottom subassembly further includes a cushion comprising a foam material that is supported on the generally horizontal surface, and a trim layer comprising a fabric material disposed over the cushion. In an implementation of the third embodiment, the honeycomb structure is disposed over a majority of the lower surface of the cushion pan.

In another implementation of the third embodiment, a surface of the cushion pan defines a plurality of integral trim attachment features. The trim layer is attached to the cushion pan through engagement with the trim attachment features. In a variation of this implementation, the seat bottom subassembly further comprises a first side shield that is integral with the cushion pan. The first side shield is disposed substantially adjacent a periphery of the cushion pan and oriented substantially transverse to the cushion pan. The seat bottom subassembly still further comprises a second side shield integral with the cushion pan. The second side shield is disposed substantially adjacent a periphery of the cushion pan and positioned generally opposite to the first side shield. The second side shield is oriented substantially transverse to the cushion pan. In this implementation, a portion of the plurality of trim attachment features are disposed between the cushion pan and the first side shield and a portion of the plurality of trim attachment features are disposed between the cushion pan and the second side shield.

BRIEF DESCRIPTION OF THE DRAWINGS

The description herein makes reference to the accompanying drawings wherein like reference numerals refer to like parts throughout the several views, and in which.

DETAILED DESCRIPTION OF THE PREFERRED EMBODIMENT(S)

Figure 1:
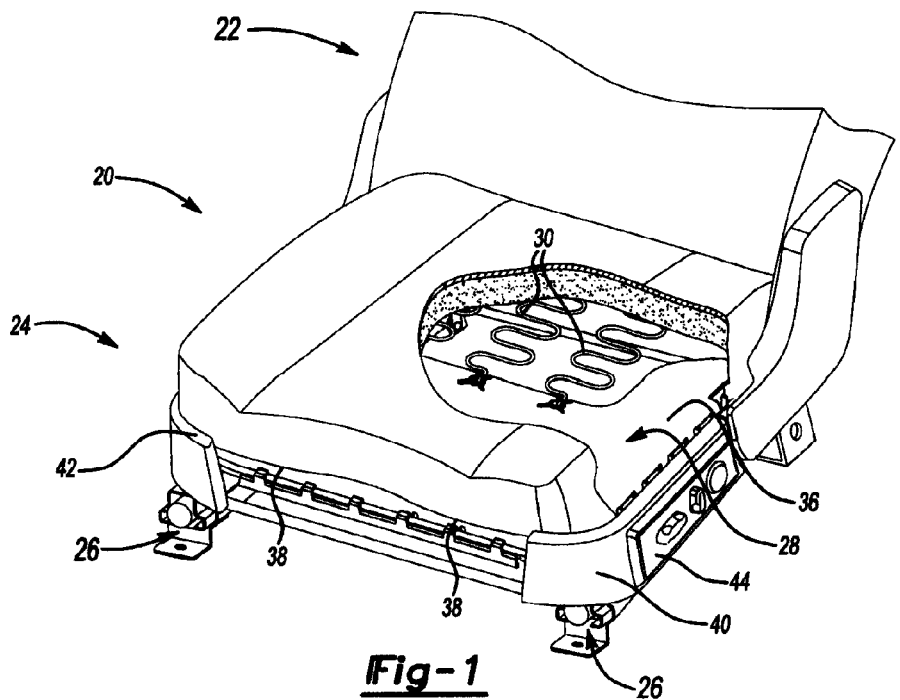
FIG. 1 is a perspective cutaway view illustrating an embodiment of a vehicle seat assembly made in accordance with the teachings of the present invention.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Vehicle seat assemblies, including, but not limited to, those used in automobiles conventionally include a backrest portion including a cushion, a metal frame, and a trim material covering the cushion portion and the metal frame. The backrest is connected to a seat bottom. The seat bottom conventionally includes a cushion portion resting on a seat cushion pan. The seat cushion pan is configured for attachment to a support structure such as a metal frame and/or a metal rail assembly for slidably attaching the seat bottom to a floor surface in a vehicle. In many embodiments, the seat cushion pan includes a plurality of springs attaching a rear portion of the seat cushion pan to a portion of the seat frame. The seat cushion pan and the springs cooperate to support the seat cushion and to provide shock absorbency.

In conventional seat assemblies, the cushion pan described above is made of steel or some other suitable metal. Because of the limitations associated with conventional metal fabrication processes, the steel from which the cushion pan is fabricated is thicker than it needs to be to provide sufficient levels of force and impact resistance. While a thinner sheet of metal could be used in the fabrication of a seat cushion pan and could provide acceptable levels of impact and force resistance, the metal cannot be fabricated with a uniform cross-section at the desirable thicknesses using conventional manufacturing processes. To avoid the problems associated with cushion pans having non-uniform cross-sectional thicknesses, manufacturers have over designed the seat cushion by using sheet metal that is thicker than necessary to support the occupant and to resist the forces that the seat assembly experiences during vehicle operations.

Such over-design of the cushion pan is costly both in terms of material cost and in terms of the weight of the vehicle seat assembly. Embodiments of the present invention address this problem by replacing the metal cushion pan with a plastic or polymeric cushion pan. By making the cushion pan out of a polymeric material, significant material cost savings may be achieved as well as significant weight reduction. Additionally, by making the cushion pan out of a polymeric material, the manufacturer is accorded the added flexibility of molding in a variety of features which, when the cushion pan is made of metal, would require secondary processes such as additional stamping, welding and other types of metal fabrication. For instance, making the cushion pan out of a polymeric material allows a manufacturer to mold in features including integral side shields, trim attachment features, spring attachment features, pivot linkages, and complex geometry such as a honeycomb wall structure for added strength. Additionally, apertures may be molded into side shields or walls of the cushion pan to accommodate mounts for various mechanisms including seat control actuators. A more thorough understanding of the invention described herein may be gained through a review of the figures accompanying this application as well as a review of the detailed description presented below.

With respect to FIG. 1, a perspective cutaway view is presented illustrating an embodiment of a vehicle seat assembly 20 made in accordance with the teachings of the present invention. Vehicle seat assembly 20 may be used in any vehicle including, but not limited to, automobiles, buses, trucks, trains, aircraft, water craft and spacecraft.

Vehicle seat assembly 20 includes a backrest member 22 connected to seat bottom subassembly 24. Backrest member 22 may be configured to pivot with respect to seat bottom 24 to provide an adjustable back support for an occupant of vehicle seat assembly 20. Backrest member 22 may include a steel frame, a foam cushion portion and an upholstery trim covering disposed over the cushion portion. Seat bottom subassembly 24 includes a rail assembly 26 which may be configured for attachment to a floor surface of a vehicle and further configured to permit seat bottom subassembly 24 to slide longitudinally forward and rearward with respect to the vehicle. Cushion pan 28 is configured for attachment to rail assembly 26 as discussed in greater detail below. In some embodiments, cushion pan 28 may be configured for attachment to an intermediate structure or frame which, in turn, is configured for connection to rail assembly 26. Cushion pan 28 is made from a polymeric material. Suitable polymeric materials for use in seat pan 28 include polypropylene (PP), acrylonitrile butadiene styrene (ABS), polyethylene (PE), polyethylene terephthalate (PET), and nylon. In addition, other thermoset and thermoplastic resins may be used. Additionally, the resins listed may be compounded with glass fiber and/or other materials to provide higher strength characteristics. In some embodiments, the compounds used to create the above listed resins may be bio-derived. For example, the compounds may be derived from corn. Cushion pan 28 may be molded using any conventional molding technique including, but not limited to, injection molding, and gas assist injection molding.

A plurality of springs 30 are attached at one end to a rear portion of cushion pan 28 and at an opposite end to pivot bar 32. Springs 30 cooperate with an upper surface of cushion pan 28 to provide a generally horizontal surface to support cushion 34. Springs 30 are configured to flex to accommodate both the weight of a seat occupant and an impact forces acting in a generally downward direction as the seat occupant shifts his weight or as the vehicle encounters bumps or otherwise jostles the seat occupant causing a downward force to act on seat bottom subassembly 24.

In the illustrated embodiment, pivot bar 32 is connected to rail assembly 26 and serves as a pivot point about which vehicle seat assembly 20 may pivot as desired by the seat occupant.

Cushion 34 is disposed over an upper surface of cushion pan 28 and springs 30 and supported thereby. Cushion 34 may be made of any suitable material including polyurethane, TDI and MDI foam. In some embodiments, two different formulations of a particular foam type may be poured into the same cushion. Using this approach allows for the manufacture of cushions with more supportive or firmer bolsters and softer inserts. Some of the compounds for manufacturing the above described foams may also be bio-derived, for example, from soy. Cushion 34 may have any desirable shape including the generally rectangular three-dimensional configuration illustrated in FIG. 1.

An upper surface 36 of cushion pan 28 may be contoured to include a pair of longitudinally oriented depressions symmetrically arranged on opposite sides of a longitudinal centerline of cushion pan 28. These depressions 38 are configured and disposed in the upper surface 36 of cushion pan 28 to provide added comfort and a natural resting place for portions of the legs of a vehicle seat occupant. Cushion 34 is compressible and may mimic the contours of depressions 38 along an upper surface of cushion 34 to communicate the added comfort of this feature to the legs of a vehicle seat occupant, whether by molding such contours into an upper surface of cushion 34 or by compressing cushion 34 in regions corresponding to the depressions on the upper surface of cushion pan 28 when a seat occupant sits down.

Figure 2:
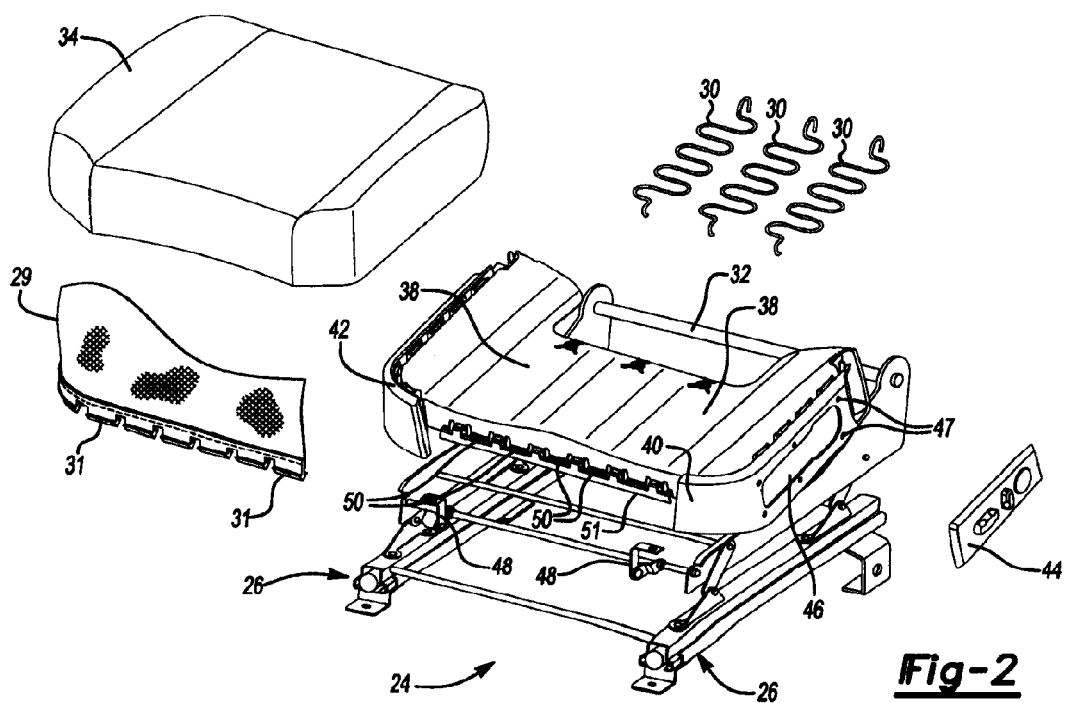
FIG. 2 illustrates an exploded view of the seat bottom subassembly portion of the vehicle seat assembly of FIG. 1.

In the embodiment illustrated in FIG. 1, cushion pan 28 includes a pair of integral side shields 40, 42 which may be formed simultaneously with cushion pan 28 as cushion pan 28 is molded. In other embodiments, cushion pan 28 may be molded without integral side shields 40, 42 or with only a single side shield such as side shield 40. Side shields 40, 42 serve both an aesthetic purpose of concealing the undercarriage of vehicle seat assembly 20 as well as the practical purpose of serving as a platform for mounting control modules such as switch bezel 44. As illustrated in FIG. 2, side shield 40 includes an aperture configured to receive switch bezel 44. Switch bezel 44 may include a variety of seat control actuators such as controls for fore/aft seat bottom movement, forward/rear backrest adjustment, up and down seat bottom movement, pivotal movement of vehicle seat assembly 20 about pivot bar 32 and lumbar controls, to name a few. A variety of different switch bezels 44 may be compatible with the aperture in side shield 40 to allow manufacturers the flexibility to provide different appearances or accents for vehicle seat assembly 20 without the cost associated with the retooling to provide differently sized apertures or attachment features.

Disposed over cushion 34 is trim member 29. Trim member 29 may comprise any suitable fabric including, but not limited to, cloth and leather. Trim member 29 is attached to cushion pan 28 through engagement between engagement members 31 and trim attachment features disposed about a perimeter of cushion pan 28 as discussed below. Engagement members 31 may be made of any suitable material including, but not limited to, plastics such as polyethylene (including high and medium density variants) and polypropylene. The engagement members may be sewn to a periphery of trim members 29. Alternately, they may be affixed to trim member 29 through the use of adhesives, hook and loop type fasteners, mechanical fasteners, and any other means for effectively attaching engagement member 31 to trim member 29.

With respect to FIG. 2, an exploded view of seat bottom subassembly 24 of FIG. 1 is illustrated. In this view, switch bezel aperture 46 is illustrated as well as fastener apertures 47 to permit the secure attachment of switch bezel 44 to side shield 40. This may be accomplished by any conventional means including rivets, heat stakes, threaded fasteners or any other means or mechanism effective to secure switch bezel 44 to side shield 40.

In this exploded view, rail assembly 26 can be seen in greater detail. Rail assembly 26 includes tilt linkage 48 which is configured and disposed to engage cushion pan 28 and move cushion pan 28 in an upward or downward direction to vehicle seat assembly 20 to pivot about pivot bar 32. As tilt linkage 48 rotates in a clockwise direction (from the perspective of FIG. 2), cushion pan 28 pivots about pivot bar 32 in an upward or clockwise direction (from the perspective of FIG. 2). As tilt linkage 48 rotates in a counterclockwise direction (from the perspective of FIG. 2), cushion pan 28 likewise pivots downward or in a counterclockwise direction (from the perspective of FIG. 2). Also illustrated in this view are springs 30 which are contoured and configured for attachment to a rear portion of cushion pan 28 at one end of spring 30 and for attachment to pivot bar 32 at an opposite end of spring 30.

In this exploded view, a plurality of trim attachment features 50 are illustrated disposed about a forward edge of cushion pan 28. As used in this application, the term "forward" or "front" refers to the direction of vehicle travel. "Longitudinal" also refers to the direction of vehicle travel. When reference is made to the "rear" of the cushion pan 28 or vehicle seat assembly 20, that term refers to a direction opposite to the direction of vehicle travel. While trim attachment features 50 are illustrated as disposed about a front edge of cushion pan 28, it should be understood that trim attachment features 50 are disposed about the periphery of cushion pan 28. In the embodiment illustrated in FIG. 2, trim attachment features 50 wrap around cushion pan 28 and are disposed between a periphery or outer edge of cushion pan 28 and side shields 40 and 42. Trim attachment features 50 are integral with cushion pan 28 and are formed during the molding process by which cushion pan 28 is molded. As will be discussed below, trim attachment features 50 comprise a plurality of pairs of barbs which receive engagement members 31. Engagement members 31 are configured to interlock with and be retained by the barbs of trim attachment feature 50. In this manner, trim member 29 may be attached to seat bottom subassembly 24 in a snap-fit manner. Although trim attachment features 50 are illustrated as disposed about a periphery of cushion pan 28, it should be understood that trim attachment features 50 may be disposed in any desirable location on cushion pan 28 including, without limitation, upper surface 36 of cushion pan 28, behind leading edge 51 of cushion pan 28 and a bottom surface of cushion pan 28. Additionally, although trim attachment features 50 are illustrated as snap-fit type barbs that are configured to receive an interlocking engagement member, it should understood that any desirable configuration that is effective to secure trim member 29 to cushion pan 28 such as, but not limited to, hook and loop type fasteners, and snaps may be acceptable.

Figure 3:
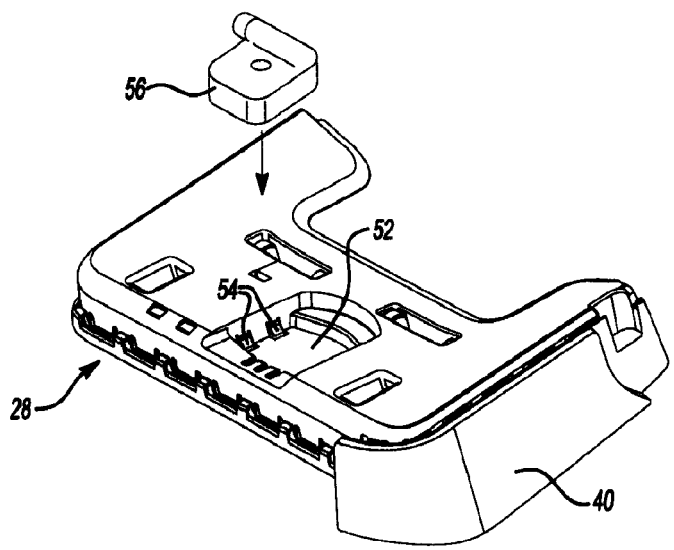
FIG. 3 is an exploded view illustrating an alternate embodiment of a cushion pan for use with the vehicle seat assembly of FIG. 1 and a component configured for attachment to the cushion pan.

With respect to FIG. 3, an alternate embodiment of cushion pan 28 is illustrated. In this embodiment, cushion pan 28 includes only a single side shield 40. Cushion pan 28 includes a cavity 52 configured to receive an electrical component for use with vehicle seat assembly 20. In the illustrated embodiment, cavity 52 is configured to receive a blower motor 56. It should be understood that in other embodiments, cavity 52 may be configured to receive other electrical components including, but not limited to, motor assemblies for controlling movement of vehicle seat assembly 20, backrest member 22 and seat bottom subassembly 24, channels to receive duct work for heating and ventilation systems, channels to receive wire assemblies for transmitting power to the various electrical components and the wires needed to control them. Cavity 52 includes snap-fit features 54 configured to engage a tab (not shown) on the blower motor and to retain the blower motor within cavity 52 during assembly and vehicle operations. It should be understood that, although a single cavity 52 is illustrated in FIG. 3, a plurality of cavities may be molded into cushion pan 28 to receive a plurality of different components and to retain such components in secure fashion to cushion pan 28.

Figure 4:
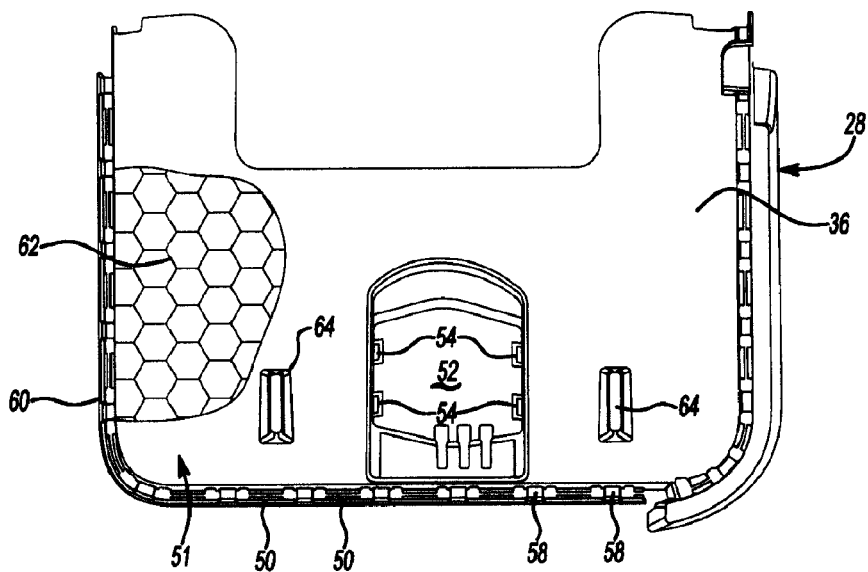
FIG. 4 is a fragmentary, cut-away plan view of a portion of the seat cushion pan of FIG. 3.

With respect to FIG. 4, an expanded, cut-away fragmentary plan view of a portion of cushion pan 28 of FIG. 3 is illustrated. In this view, two additional snap-fit members 54 are illustrated on a right side of cavity 52 which are intended to cooperate with the snap-fit members 54 on the left side of cavity 52 and hold blower motor 56 in place. The trim attachment features 50 are illustrated in detail in FIG. 4. Here, a plurality of pairs of barbs can be seen disposed about the leading edge 51 of cushion pan 28. A plurality of bridge members 58 also protrude from leading edge 51 and support an outer ridge 60 which runs substantially parallel to leading edge 51 and which supports one of the barbs of each pair of barbs. In areas around the periphery of cushion pan 28 where side shields 40 and 42 are located, bridge members 58 connect side shields 40 and 42 to the periphery of cushion pan 28 in substantially the same manner as illustrated in FIG. 4.

A portion of upper surface 36 of cushion pan 28 has been cutaway to illustrate a honeycomb structure 62 supporting an underside of cushion pan 28. Honeycomb structure 62 is integrally formed with cushion pan 28 during the molding process. Honeycomb structure 62 may comprise a plurality of walls or ribs molded into an underside of cushion pan 28 and oriented in a direction generally transverse to upper surface 36 of cushion pan 28. Honeycomb structure 62 may take any suitable configuration including, but not limited to, the hexagonal configuration illustrated. Honeycomb structure 62 provides added rigidity and strength to cushion pan 28 to facilitate the support of vehicle seat occupants.

Also illustrated in FIG. 4 are a pair of stanchions 64 molded into cushion pan 28. Stanchions 64 extend from upper surface 36 of cushion pan 28 in a generally downward direction towards rail assembly 26 and are configured to engage pivot bar 32, discussed in greater detail below.

Figure 5:
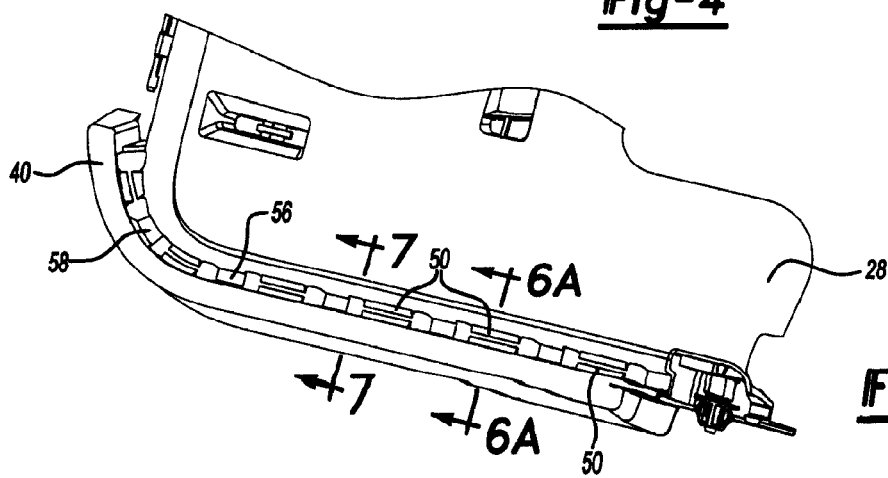
FIG. 5 is a fragmentary perspective view illustrating a side shield and a plurality of trim attachment features disposed about the seat cushion pan of FIG. 3.

FIG. 5 is a perspective view illustrating a portion of the cushion pan 28 of FIG. 3 including side shield 40. In this illustration, the bridge members 58 can be seen connecting side shield 40 to a periphery of cushion pan 28. Trim attachment features 50, comprising pairs of barbs projecting horizontally from the periphery of the cushion pan 28 and the inner wall of side shield 40, can be seen disposed between side shield 40 and cushion pan 28. As illustrated, bridge members 58 and trim attachment features 50 are disposed in an alternating pattern around the periphery of cushion pan 28. While a series of relatively small bridge members 58 and small trim attachment features 50 are illustrated, it should be understood that other configurations may also be employed including, but not limited to, the use of bridge members which are larger than the trim attachment features. Additionally, multiple pairs of barbs may be disposed between bridge members.

Figure 6A:
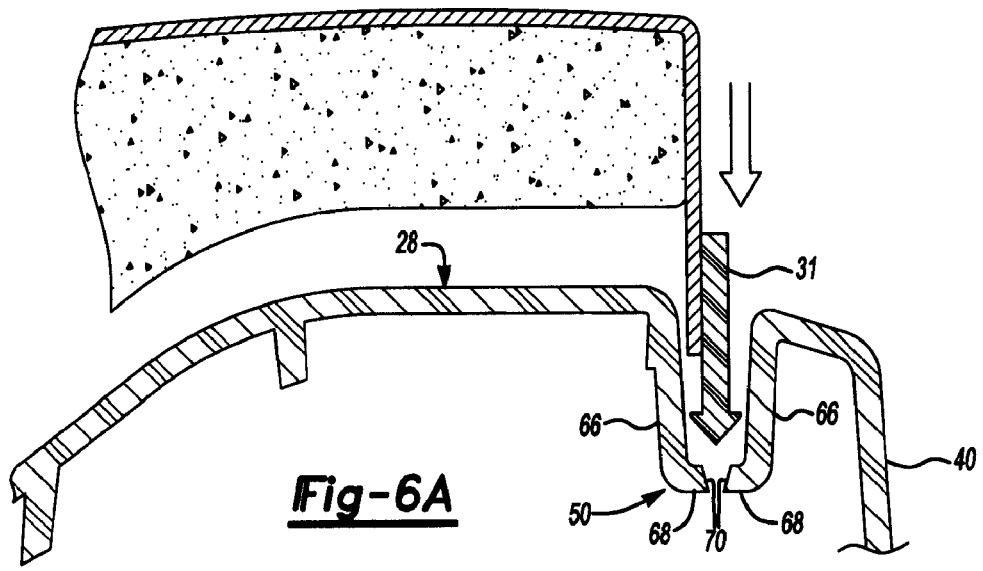
FIG. 6A is a fragmentary cross-sectional view taken along the line 6A-6A of FIG. 5 prior to trim attachment.

With respect to FIG. 6A, a cross-section taken along the line 6-6 in FIG. 5 is illustrated. Trim attachment feature 50 includes a pair of generally parallel, downwardly extending walls 66 at the base of which are a pair of opposing barbs 68 extending towards one another. An end of each barb includes a camming surface 70. Engagement member 31 includes an arrow head configured to engage camming surfaces 70. As the engagement member 31 is pushed downward against camming surfaces 70, walls 66 flex temporarily away from one another and in turn increase the gap between barbs 68 which permits engagement member 31 to continue moving downwardly until it passes the camming surfaces 70 which then snap back into position.

Figure 6B:
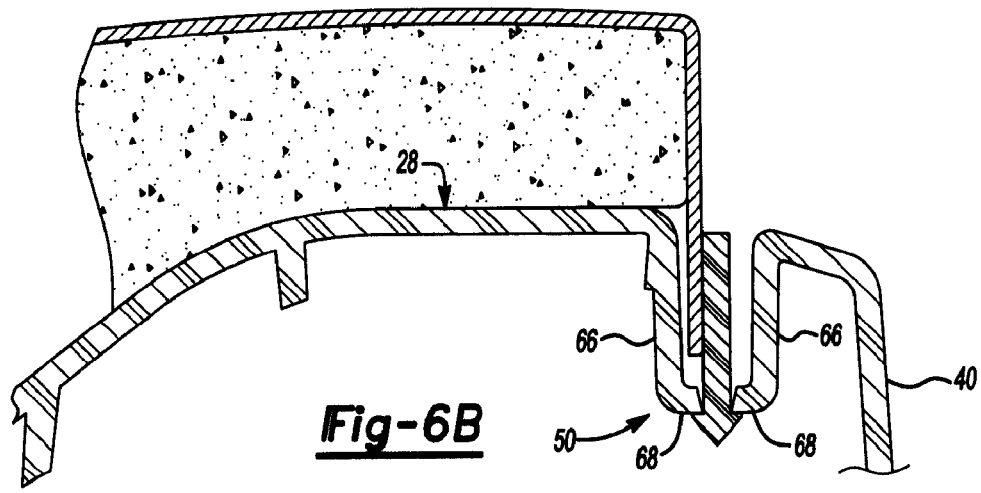
FIG. 6B is a fragmentary cross-sectional view taken along the lines 6A-6A of FIG. 5 subsequent to trim attachment.

FIG. 6B illustrates trim attachment feature 50 engaged with engagement member 31.

Figure 7:
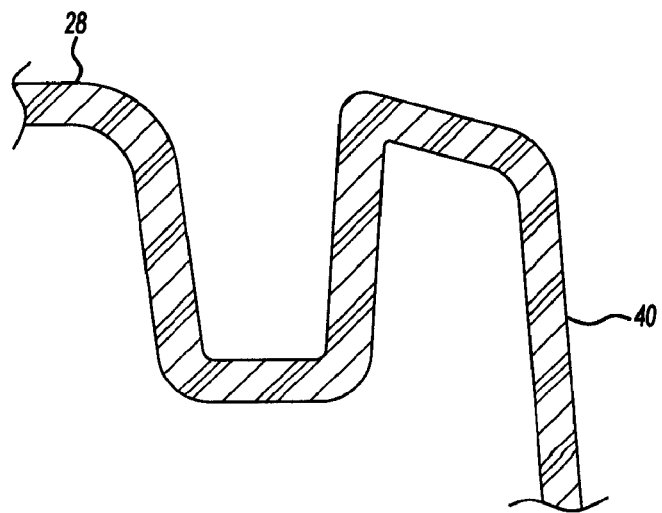
FIG. 7 is a fragmentary cross-sectional view taken along the line 7-7 of FIG. 5.

FIG. 7 illustrates a cross section taken along the line 7-7 of FIG. 5. In this view, bridge member 58 is illustrated joining side shield 40 and cushion pan 28.

Figure 8:
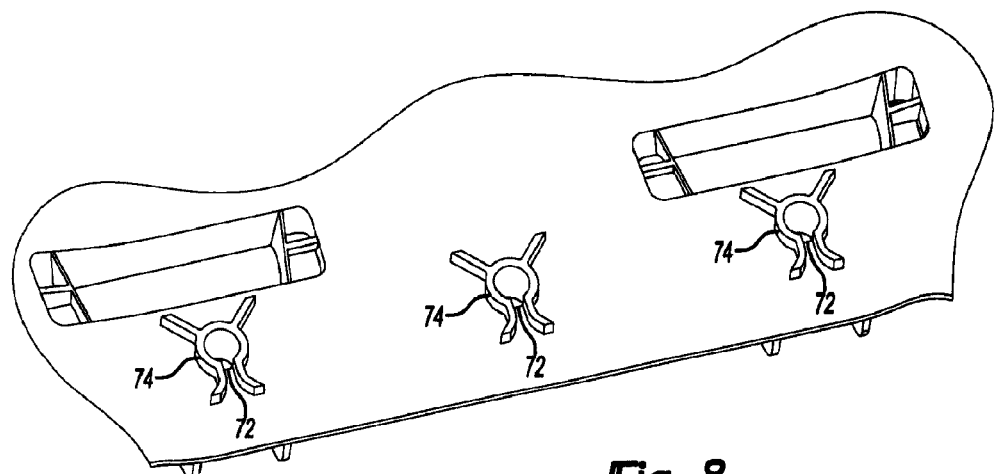
FIG. 8 is a fragmentary perspective view illustrating a spring attachment feature of the seat cushion pan illustrated in FIG. 3.

FIG. 8 is a perspective view illustrating a rear edge of cushion pan 28. In this view, spring engagement apertures 72 are illustrated. Spring engagement apertures 72 include an opening extending through cushion pan 28 to receive a hooked end of spring 30 and a guide wall 74 configured to ensure proper orientation of the spring member 30 when engaged with spring engagement aperture 72. Although the spring engagement apertures illustrated in FIG. 8 extend completely through cushion pan 28, it should be understood that other configurations may also be effective for securing spring 30 to cushion pan 28 including apertures that do not extend entirely through cushion pan 28. Other configurations for spring engagement aperture 72 include integral loops, hooks and other projections effective for connecting springs 30 to cushion pan 28.

Figure 9:
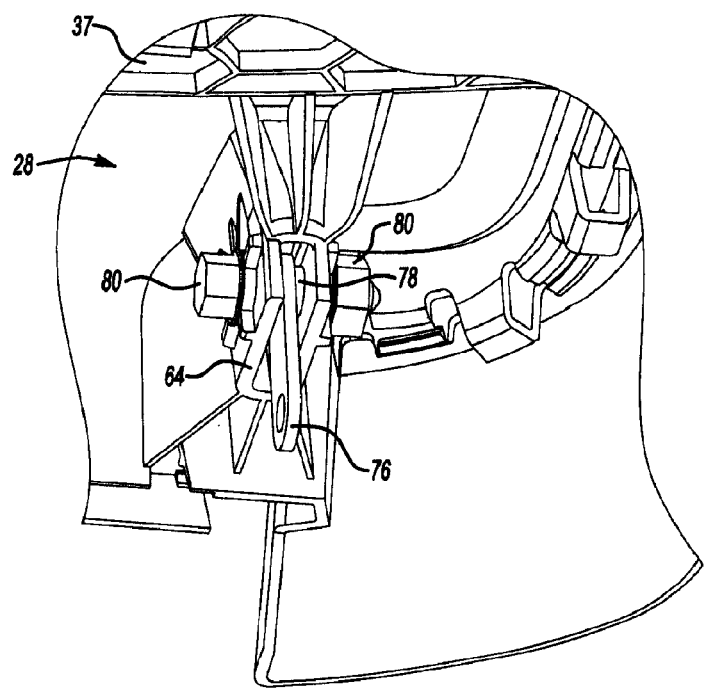
FIG. 9 is a fragmentary perspective view of a portion of an underside of the seat cushion pan of FIG. 3 illustrating a support stanchion and link.

With respect to FIG. 9, a perspective view illustrating a portion of the underside of cushion pan 28 is illustrated. In this view, stanchion 64 is illustrated projecting downward from a bottom surface 37 of cushion pan 28. A linkage 76 is illustrated for engaging tilt linkage 48 (see FIG. 2) which facilitates the raising and lowering of the front end of cushion pan 28 as tilt linkage 48 pivots forward and rearward. Linkage 76 is connected to stanchion 64 by a cotter pin 78 which is secured in place by a pair of nuts 80 secured through threaded engagement to opposite sides of cotter pin 78.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
a cushion pan having a first surface, a second surface disposed opposite the first surface, a first side shield that extends along a first side of the cushion pan and along only a portion of a front side of the cushion pan, a first set of trim attachment features disposed in a first groove located between the first side shield and the first surface, and a second set of trim attachment features disposed along the front side of the cushion pan and spaced apart from the first side shield and the first set of trim attachment features;
a cushion disposed on the first surface; and
a trim layer disposed over the cushion and having an engagement member;
wherein the engagement member is inserted into at least one of the first and second sets of trim attachment features to couple the trim layer to the cushion pan.

2. The seat assembly of claim 1 wherein the first and second sets of trim attachment features comprises a pair of barbs configured to receive a portion of the trim layer.

3. The seat assembly of claim 2 wherein the trim layer further includes a plurality of engagement members disposed around a portion of a periphery of the trim layer and wherein the plurality of trim attachment features are disposed around a portion of a periphery of the cushion pan.

4. The seat assembly of claim 3 wherein each of the engagement members is configured to snap fit into a respective pair of barbs.

5. The seat assembly of claim 1 wherein a surface of the cushion pan is contoured to define two longitudinally oriented depressions substantially symmetrically arranged about a central longitudinal axis of the cushion pan.

6. The seat assembly of claim 1 wherein the cushion pan defines a cavity for receiving an electrical component.

7. The seat assembly of claim 6 wherein the cavity is defined in an upper surface of the cushion pan.

8. The seat assembly of claim 1 further comprising a linkage connected to the cushion pan for controlling a tilt angle of the cushion pan, wherein a bottom surface of the cushion pan defines a stanchion configured to receive the linkage.

9. A seat assembly comprising:
a seat bottom subassembly including:
a cushion pan having a first side shield disposed substantially adjacent a periphery of the cushion pan and oriented substantially transverse to the cushion pan;
a cushion supported by the cushion pan; and
a trim layer disposed over the cushion and having an engagement member;
wherein the cushion pan has a plurality of trim attachment features disposed about a periphery of the cushion pan, a portion of the plurality of trim attachment features being disposed completely between the cushion pan and the first side shield and wherein the trim layer is attached to the cushion pan by the engagement member when the engagement member is received by the trim attachment features; and
wherein the cushion pan defines a plurality of spring engagement apertures and wherein the seat bottom subassembly further comprises a plurality of springs, each spring engaging a respective one of the spring engagement apertures, the plurality of springs cooperating with the cushion pan to support the cushion.

10. The seat assembly of claim 9 wherein a surface of the first side shield defines an opening configured to receive a control mechanism mounting subassembly.

11. The seat assembly of claim 9 wherein a portion of the plurality of trim attachment features are disposed against the first side shield.

12. The seat assembly of claim 11 wherein the seat bottom subassembly further comprises a second side shield disposed substantially adjacent a periphery of the cushion pan and positioned generally opposite to the first side shield.

13. The seat assembly of claim 9 wherein the cushion pan includes a honeycomb structure.

14. The seat assembly of claim 9 wherein the cushion pan is contoured to define two longitudinally oriented depressions substantially symmetrically arranged about a central longitudinal axis of the cushion pan.

15. The seat assembly of claim 9 wherein the cushion pan defines a cavity for receiving an electrical component.

16. The seat assembly of claim 9 wherein the seat bottom subassembly further includes a linkage connected to the cushion pan for controlling a tilt angle of the seat bottom subassembly, and wherein the cushion pan defines a stanchion configured to receive the linkage.

17. A seat assembly comprising:
a cushion pan having a first surface and a second surface defining a plurality of walls oriented transversely to the first surface, the plurality of walls comprising a honeycomb structure that is disposed over a majority of the second surface, a side shield disposed along a perimeter of the cushion pan, and a trim attachment feature disposed in a groove between the side shield and the honeycomb structure;
a cushion supported by the first surface; and
a trim layer disposed over the cushion.

18. The seat assembly of claim 17 wherein the honeycomb structure has a hexagonal configuration.

19. The seat assembly of claim 17 wherein a surface of the cushion pan defines a plurality of integral trim attachment features and wherein the trim layer is attached to the cushion pan through engagement with the trim attachment features.

20. The seat assembly of claim 19 further comprising a second side shield disposed substantially adjacent a periphery of the cushion pan and positioned generally opposite the side shield.

* * * * *